United States Patent Office 2,813,917
Patented Nov. 19, 1957

2,813,917

PREPARATION OF ALKARYL SULFONATES

Marion L. Sharrah, Ponca City, Okla., assignor to Continental Oil Company, Ponca City, Okla., a corporation of Delaware No Drawing. Application July 6, 1954,
Serial No. 441,679

8 Claims. (Cl. 260—671)

This invention relates to an improved process for the preparation of alkaryl sulfonates of high purity that are particularly useful as detergents. My improved process which will be disclosed more fully hereinafter is not only economical but the operating conditions are not critical, thus making for a practical commercial process.

Briefly, the invention may be described in tabular form as follows:

I. Raw materials:
    A. Olefin hydrocarbon
    B. Aromatic hydrocarbon
II. Processing steps:
    A. Preparation of the polyolefin
        1. Polymerization
        2. Fractionation
    B. Purification of the polyolefin
    C. Preparation and purification of the alkylated aromatic hydrocarbon
        1. Condensation
        2. Sludge separation
        3. Acid treatment
        4. Caustic wash
        5. Fractionation
    D. Sulfonation
    E. Neutralization In its broadest aspect the invention comprises the preparation of polyolefins by polymerizing low molecular weight olefins, the purification of crude polyolefins by contacting the same with a cationic material such as aluminum chloride, separation of the sludge that forms, and fractional distillation of the treated product. Following its purification, the polyolefin is treated with an aromatic hydrocarbon such as benzene or toluene in the presence of an alkylation catalyst and at an elevated temperature. Following the alkylation reaction, the catalyst sludge is allowed to settle after which the sludge is drawn off. The crude alkyl substituted aromatic hydrocarbon is then extracted with the sulfuric acid which removes color and odor precursors. After extraction with the sulfuric acid, the product is neutralized with alkali and the excess alkali removed. This product is subject to fractional distillation whereby an alkyl substituted aromatic compound is obtained as a fraction which is substantially free of color and odor precursors. The sulfonation of this product produces a sulfonic acid possessing excellent color and odor. Finally the sulfonic acid is neutralized to produce a sulfonate of an improved color and odor and also possessing increased detergent properties.

In order to disclose the nature of the present invention still more clearly, the individual steps as given above in tabular form will be described in detail and illustrated by specific examples. In the examples all parts are by weight.

I. RAW MATERIALS

A. *Olefin hydrocarbon*

Olefin hydrocarbons that may be used in the process of this invention are low molecular weight olefins such as pure propylene, mixtures of propylene, or mixtures of propylene and ethylene with other volatile hydrocarbons such as are present in cracked gases.

B. *Aromatic hydrocarbons*

The aromatic hydrocarbon may be benzene or toluene; however, other aromatic hydrocarbons may be used if desired.

II. PROCESSING STEPS

A. *Preparation of the polyolefin*

1. POLYMERIZATION

The olefin hydrocarbons mentioned above are polymerized in the process of this invention to an average molecular weight corresponding to about 6 carbon atoms to about 18 or more carbon atoms and preferably about 9 to 15 carbon atoms. The polymerization of the olefins may be accomplished by any of the processes known to the art such as by contacting the hydrocarbon with a catalyst of aluminum chloride, phosphoric acid catalyst, hydrogen chloride, etc. A preferred method of polymerizing the olefin hydrocarbon is by contacting with a catalyst of phosphoric oxide on kieselguhr at a temperature of 205° C. and a pressure of 1,000 pounds per square inch. To obtain my preferred polyolefin the feed to the polymerizing unit consists of a mixture of one part of propylene to one part of recycled low molecular weight polyolefin separated from the reaction product by fractionation.

2. FRACTIONATION

The polymerization product is fractionated by distillation through a suitable column and may be separated into any of the following fractions or combination of fractions.

| Fraction | B. P. | Average Component |
| --- | --- | --- |
| I | 50–70° C | Hexylene. |
| II | 120–155° C | Nonylene. |
| III | 180–248° C | Dodecylene. |
| IV | 120–150/15 mm | Pentadecylene. |
| V | 170–200/15 mm | Octadecylene. |

A preferred facet of my invention would be to separate the dodecylene fraction boiling 180–248° C. for use in subsequent steps of the invention and to recycle to the polymerization unit that fraction boiling below 180° C. The preferred dodecylene fraction has the following A. S. T. M. distillation characteristics:

° F.
IBP _____ 352
5 percent _____ 360
10 percent _____ 363
50 percent _____ 376
90 percent _____ 435
95 percent _____ 463
EP _____ 480

Although this fraction is preferred for use in the process of my invention, other fractions boiling over other ranges of temperature may be used. Under some circumstances it may be desirable to use the crude polyolefin fractions that have not been distilled.

B. *Purification of the polyolefins*

In the production of sulfonate detergents and particularly their relatively high molecular weight phenyl alkane components by alkylation or condensation reactions, a paramount problem has been the provision of a suitable alkane. Olefins such as butene polymers have been proposed as an alkane source, but introduce outstanding difficulties which arise from instability of the branched-aliphatic chains characteristic of such polymers. Straight-chain olefins are of limited availability and prohibitive in cost. The instability of branched aliphatic polymer chains is reflected, for example, in alkylating and condensation reactions with benzene or toluene and results in degradation of the polymer chain during condensation. This degradation leads to the production of a mixture of phenyl alkanes containing compounds both lower and higher in aliphatic molecular weight than the olefin originally selected and desired. The instability and degradation of the olefin polymers in the presence of condensation catalysts under alkylating conditions also leads to the production of substantially inseparable polyalkylated aromatics of the same molecular weight and boiling range as the desired phenyl alkanes. This is a decided disadvantage since, upon conversion of such degraded mixtures to the sulfonated phenyl derivatives, relatively low yields have resulted. The sulfonated derivatives tend to be relatively poor in detergent quality and require costly purification treatment to eliminate or reduce odor, unsulfonatable residue, color bodies, and other impurities introduced by degradation caused by the original instability of the olefin polymer. Heretofore such deficiencies have seemed to be inherent in the branched-chain structure of olefin polymers, and the mixture of phenyl alkanes derived from such polymers have contained relatively large quantities of polyalkylated aromatics and unsulfonatable residue. At best these impurities have not been entirely separable and have imparted undesirable odor or color to the sulfonated products.

I have now discovered that improved sulfonates may be produced having little odor and little color and possessing improved detergent properties by using a polyolefin that has been treated in accordance to one aspect of my invention to remove the undesirable isomers and homologues therefrom. The undesirable isomers and homologues have the structure: $RR'C=CH_2$ and absorb infra-red at approximately 11.24 microns. By the removal of these undesirable isomers and homologues the concentration of desirable isomers is increased, which have the structure $R''CH=CHR'''$ and absorb infra-red at approximately 10.36 microns. The R's are alkyl radicals and may be the same or different. The removal of the undesirable isomers and homologues is accomplished by the treatment of the crude polyolefin with a cationic material, separation of the sludge so formed followed by distillation of the remaining product. According to the average molecular weight desired in the treated polyolefin, the material may be distilled and fractions taken in accordance with the fractions given in Section II–A–1 above. The polyolefins obtained are of improved stability and yield better products in higher yields on subsequent reaction.

Useful cationic materials may be selected from the group of acidic materials capable of causing the polymerization of compounds having a terminal double bond. Such materials include catalysts of the Friedel-Crafts type such as:

Group II halides: Zinc chloride.
Group III halides: Boron fluoride, boron chloride, boron bromide, aluminum chloride, aluminum bromide, aluminum iodide, galium chloride, scandium chloride.
Group IV halides: Titanium tetrachloride, titanium tetrabromide, stannic chloride, stannic bromide.
Group V halides: Antimony trichloride, antimony pentachloride, antimony tribromide, bismuth trichloride.
Miscellaneous: Ferric chloride.

The amount of cationic material used varies from about 1 percent to about 10 percent or more, preferably from about 2 to 10 percent based on the weight of the crude polyolefin. Suitable temperatures range from about 25 to about 150° C., but 30 to 75° C. is preferred. The time of reaction may be varied from about ¼ of an hour to more than 24 hours; however, 1 to 3 hours is preferred. The time of treatment is related to the temperature in that the higher the temperature the shorter the reaction time. Following the catalyst treatment the sludge is usually removed by filtration or by centrifuging after which filtrate is washed with water, dried, and then distilled. The treated polyolefin may be drowned in water and the water layer separated, discarded, and the product distilled. The treated product, however, may be distilled without resorting to the filtration, drowning, and washing steps if desired.

EXAMPLE 1

Five hundred parts of dodecene (B. P. 41–97° C. at a pressure of 2 mm.) was placed in a reaction vessel which was equipped with stirrer, thermometer, and heating means. Fifteen parts of anhydrous aluminum chloride (3 percent) was added and the temperature rose from 25° C. to 30° C. in one hour. External heating was applied and the temperature maintained at 50° C. for 24 hours. After this time the product was filtered, washed with two 100 parts of water. After drying over calcium chloride the product was distilled and collected over a range of 41 to 125° C. at a pressure of 2 mm. The improvement in the dodecene is shown by the following data from infra-red spectrometric analysis:

| Wavelength, Microns | Base-line corrected absorbance [1] | | |
|---|---|---|---|
| | Original | Undistilled Product | Distilled Product |
| 10.36 | 0.405 | 0.470 | 0.516 |
| 11.24 | 0.353 | 0.137 | 0.118 |

[1] From Wright, N., Ind. Eng. Chem., Anal. Ed., 13, 1 (1941).

$$(As)_B = \log_{10} \frac{I_B}{I}$$

where $(As)_B$ is the base line absorbance, I is the distance on the recorded spectrum from the zero line to the selected absorption peak, $I_B$ is the distance from the zero line to the base-line joining two spectral points located near the absorption peak. In the following examples absorption data will be given as an indication of purity.

EXAMPLE 2

Dodecene (B. P. 178–249° C.) was treated as in Example 1 except that samples were taken out after 1, 2, 5, and 18 hours and analyzed by infra-red spectrometric after filtering, washing, and drying. The following data were obtained:

| Wavelength, Microns | Base-line corrected absorbance | | | | |
|---|---|---|---|---|---|
| | Original | 1 hr. | 2 hr. | 5 hr. | 18 hr. |
| 10.36 | 0.461 | 0.387 | 0.474 | 0.372 | 0.441 |
| 11.24 | 0.421 | 0.204 | 0.200 | 0.153 | 0.152 |

EXAMPLE 3

Five hundred parts of dodecene was treated with 50 parts of aluminum chloride in equipment similar to that used in Example 1 for 8 hours at 50° C. The product was worked up by drowning in 200 parts water and ice to keep the temperature below 50° C. The product layer was separated, washed with water, dried, and distilled. There was obtained 380 parts material boiling 175 to 250° C. This material showed the following infra-red analysis:

| Wavelength, Microns | Base-line corrected absorbance | |
| --- | --- | --- |
| | Original | Distilled Product |
| 10.36 | 0.461 | 0.474 |
| 11.24 | 0.421 | 0.038 |

EXAMPLE 4

Five hundred parts of dodecene was treated as in Example 3 with 30 parts of aluminum chloride and 0.1 part of water for 8 hours at 30° C. The product was worked up as in Example 3. There was obtained 450 parts material boiling 175 to 250° C. This material had base line absorbances of 0.475 and 0.055 at 10.36 and 11.24 microns, respectively. This is, therefore, very low in concentration of dodecene having terminal methylene groups.

EXAMPLE 5

Five hundred parts of nonene was treated as in Example 4 for dodecene. There was obtained 405 parts of product having base line absorbances of 0.733 and 0.000 at 10.36 and 11.24 microns, respectively. The original nonene had base line absorbances of 0.710 and 0.496 at 10.36 and 11.24, respectively. Thus, the isomers having terminal double bonds in the crude nonene had been removed completely.

EXAMPLE 6

Example 4 was repeated except antimony pentachloride was used in place of aluminum chloride. There was obtained 440 parts product having a low base line absorbance at 10.36 microns.

EXAMPLE 7

Four thousand parts of dodecene was treated with 130 parts of aluminum chloride for a period of 2¼ hours, during which time the temperature rose autogenously from 25 to 40° C. After working up the product in the manner described above there was obtained 2,930 parts of material boiling 178–242° C. and having the following infra-red analysis:

| Wavelength, Microns | Base-line Corrected Absorbance | |
| --- | --- | --- |
| | Original | Distilled Product |
| 10.36 | 0.461 | 0.462 |
| 11.24 | 0.421 | 0.194 |

C. Preparation and purification of the alkylated aromatic hydrocarbon

Although other methods may be used, I prefer the procedure disclosed by Paul E. Geiser in the co-pending application, Serial No. 438,354 filed June 21, 1954, which invention is assigned to the present assignee which disclosure is made a part of this application.

1. CONDENSATION

In actual operation the specific reagents, the amount of each, and the reaction conditions may be varied widely. Theoretically in the process, one mole of the aromatic hydrocarbon reacts with one mole of the olefin. In practice, however, I prefer to employ an excess of the aromatic hydrocarbon over the olefin. Generally the mole ratio of aromatic hydrocarbon to the olefin may vary between the limits of 3.8:1 and 10:1; preferably between 5:1 and 7.5:1. Another variable is the alkylation catalyst. Preferred catalysts are those of the Friedel-Crafts type, especially aluminum chloride and complexes thereof. Other catalysts which may be used include sulfuric acid, sulfonic acids, hydrogen chloride, hydrogen fluoride, boron trifluoride, zinc chloride, activated bleaching earths, and phosphoric acid. When aluminum chloride is used a better final product in respect to color and odor is obtained than when other alkylation catalysts are used. In respect to the amount of aluminum chloride catalysts, that may vary from 1 to 5 percent; preferably 2 to 3 percent, based upon the total amount of olefin and aromatic hydrocarbon present. The condensation reaction is carried out within the temperature range of from about 100 to 160° F. with agitation. The reaction time, as is true of most chemical reactions, varies inversely as the temperature, the higher the temperature the shorter the reaction time. Generally, it may be stated, however, that the reaction time may vary from a few minutes to about one hour.

EXAMPLE 8

Alkylation of benzene

An iron reactor equipped with an agitator and an external heat exchanger for control of temperature was charged with 3,090 parts benzene, 32 parts aluminum chloride, and 3.8 parts water. During 30 minutes 1,512 parts dodecene preferentially polymerized as in Example 7 was charged into the reactor. Five minutes after the addition of dodecene was started 8 parts of aluminum chloride was added and then after 15-minute intervals 8 parts aluminum chloride was added until a total of 72 parts aluminum chloride had been added to the reactor. The mixture was agitated for an additional 20 minutes after all additions were complete. During the reaction the temperature was allowed to climb to 46° C.

2. SLUDGE SEPARATION

Following the reaction between the aromatic hydrocarbon and the olefin in the presence of the alkylation catalyst, the resulting mixture is allowed to settle for approximately 30 minutes after which period the catalyst sludge is drawn off. If desired, an additional quantity of the catalyst may be added, the resulting mixture agitated and again allowed to settle after which the catalyst sludge is drawn off.

EXAMPLE 9

After allowing the reaction mixture of Example 8 to settle for 30 minutes the catalyst sludge was withdrawn.

While the foregoing is essentially a batch process, benzene, toluene, or other aromatic hydrocarbon may be alkylated continuously following the teachings of U. S. Patent 2,477,382.

3. ACID TREATMENT

Color and odor precursors contained in the crude alkyl substituted aromatic compound are removed by extraction with sulfuric acid. Both the concentration and the quantity of the sulfuric acid used as a selective solvent for the color and odor precursors may be varied. Suitable and preferred quantities of the acid may vary from 1 to 25 percent and 3 to 10 percent, respectively, based upon the amount of crude alkylation product present. Suitable and preferred concentrations of the sulfuric acid may vary from 80 to 100 percent and 90 to 95 percent, respectively. The temperature employed in the extraction step is not critical; for convenience a temperature of about 70° F. is preferred. The extraction of the crude alkylation product may be carried out either as a batch process or as a continuous process.

EXAMPLE 10

Treatment of the crude detergent alkylate with sulfuric acid

The crude alkylation product of Example 8 was agitated with 180 parts of 96 percent sulfuric acid for about 15 minutes at a temperature of 70° F. After allowing the mixture to settle for about 15 minutes two layers were formed, an upper layer consisting predominantly of the alkylation product and a lower or sulfuric acid layer consisting predominantly of sulfuric acid having dissolved therein the color and odor precursors.

4. CAUSTIC WASH

Any sulfuric acid contained in the alkylated aromatic hydrocarbon layer following extraction with sulfuric acid is neutralized by washing with an aqueous alkali solution such as sodium hydroxide, potassium hydroxide, or other base. A preferred concentration of the alkali is about 5 percent, however, concentrations above or below this value may be used.

EXAMPLE 11

The acid washed product of Example 10 was contacted with a 5 percent aqueous sodium hydroxide solution to neutralize the excess acidity. Approximately 3,990 parts of the alkylation product (crude detergent alkylate) was obtained.

5. FRACTIONATION

Since the condensation is effected in the presence of an excess of the aromatic compound, the resulting product after extraction with sulfuric acid will contain a considerable quantity of the unreacted aromatic hydrocarbon. In addition, it will contain some lower molecular weight monoaryl alkanes, a large fraction of the alkyl substituted aromatic hydrocarbon, and finally some heavier, higher-boiling bottoms consisting predominantly of polyalkyl substituted aromatic compounds. The desired product may be recovered from the other components in the mixture by fractional distillation under reduced pressure. The temperature at which the different components are removed by distillation is dependent upon the identity of the component and upon the pressure at which the distillation is conducted. Generally, a pressure of about 20 mm. of mercury is maintained during the distillation and, as a rule, at this pressure the unreacted aromatic hydrocarbon and the lower molecular weight monoaryl alkanes will be removed below about 100° C. and the desired alkyl substituted aromatic will be obtained over a temperature range of about 100 to about 230° C. For best results, however, I prefer to collect the desired product over a somewhat more limited temperature range; namely, 143 to 205° C.

EXAMPLE 12

The neutralized product of Example 10 neutralized according to the method described in Example 11 was subjected to fractional distillation at a pressure of 20 mm. of mercury. A total of 1,061 parts of the purified detergent alkylate was collected as a distillate over a temperature range of 143 to 205° C. which had a mild pleasant odor, a Klett color of 67, A. P. I. gravity of 30.6, and an ebullioscopic molecular weight of 251.

D. Sulfonation

The product (purified detergent alkylate) may be sulfonated by any of the methods well known to those skilled in the art by treatment with any suitable sulfonating agent such as chlorosulfonic acid, fuming sulfuric acid (oleum), etc. A suitable sulfonating agent is 5 to 25 percent fuming sulfuric acid in the ratio of 2 to 5 moles of acid per mole of the detergent alkylate. The temperature during initial stages during the sulfonation reaction desirably should be kept below about 45° C. by cooling and adding the acid slowly to the alkylate. To obtain substantially complete reaction, temperatures above about 30° C. should be reached. Thorough agitation should be maintained and local overheating avoided to minimize or prevent side reactions during the sulfonation. The spent acid may be separated from the sulfonic acid either by stratification either with or without the addition of cold water and the spent acid discarded. This procedure is illustrated by Example 13 below.

A preferred method of sulfonation is by the continuous sulfonation process disclosed in the co-pending application by H. E. Luntz and D. O. Popovac, Serial No. 396,822, filed December 8, 1953, entitled "Method of Sulfonating Alkyl Aromatic Hydrocarbons." This latter invention is assigned to the present assignee and the disclosure contained therein is made a part of this application. In brief, Luntz and Popovac disclose a method of sulfonating an alkyl aromatic hydrocarbon wherein the sulfonatable material is introduced into one end of a modified Votator and in passing therethrough the sulfonatable materials forms a film on the refrigerated surface of the Votator. When first contacted with the sulfonating agent (sulfur trioxide admixed with dry air) the film is only partially sulfonated and is removed in that condition by the progressively moving scrapers. The partially sulfonated material is then re-applied to the refrigerated surface farther along in the Votator as a film and contacted with an additional quantity of the sulfonating agent. The steps of removing the film, re-applying to the surface, and contacting with an additional quantity of the sulfonating agent are repeated until the completely sulfonated material is removed from the other end of the Votator. The total residence time of the sulfonatable material in the Votator may vary from a fraction of a second to 5 seconds when the temperatures employed vary from about 50 to about 200° F. The Votator when so used is highly efficient as a heat exchanger and, as a result, the temperature of the reaction mixture and the temperature of the refrigerated surface differ by a few degrees only. This procedure is illustrated by Example 14 below.

EXAMPLE 13

While agitating vigorously and maintaining the temperature at 25–30° C., there was added 312.5 parts of 23 percent oleum during 24 minutes to 250 parts of dodecylbenzene prepared as in Example 12. The mixture was then agitated for an additional hour while the temperature was allowed to rise to 38° C. Then, 131.5 parts of ice was added and after settling for 45 minutes the spent acid weighing 287 parts was separated.

EXAMPLE 14

The purified detergent alkylate (dodecybenzene) was continuously sulfonated in a modified Votator having .7 square feet of heat exchanger surface, two scraper blades, and 9 jets for the introduction of sulfur trioxide before each scraper blade. The Votator shaft was operated at 400 R. P. M. 29 pounds per hour of the detergent alkylate purified in accordance to Example 12 was charged to the Votator. At the same time 0.7 cubic feet of sulfur trioxide admixed with 8 cubic feet per minute of dry air was introduced into the Votator. Contact time was approximately ¼ second. Cooling water at a temperature of 60° F. was passed through the jacket of the Votator resulting in an exit temperature of the sulfonated product of 167° F. There was obtained 38.6 pounds per hour of the alkaryl sulfonic acid.

E. Neutralization

In order to prepare the detergent, the sulfonic acid is neutralized using any one of a wide variety of bases. Suitable bases include: alkali metal hydroxides, particularly sodium or potassium hydroxide, or ammonium hydroxide, or mixtures thereof, are particularly suitable although alkaline earth metal hydroxides such as calcium and magnesium hydroxide, or organic bases such as amines, including alkanolamines such as the ethanolamines, morpholine, and the like, may also be used.

EXAMPLE 15

The sulfonic acid produced in Example 13 was then neutralized to a pH of 8 by adding thereto a solution of 50 parts of sodium hydroxide in 300 parts of water. The resulting slurry (780 parts) analyzed:

|  | Percent |
|---|---|
| Water | 50 |
| Active sulfonate | 44.5 |
| Sodium sulfate | 4.85 |
| Free oil | 1.4 |
| Klett color | 76 |

The slurry was built to a solid content having 40 percent active sulfonate by addition of sodium sulfate and compared with a slurry of similar active sulfonate concentration prepared by sulfonating dodecylbenzene prepared from the alkylation of benzene with dodecene that had not been subjected to preferential polymerization:

| Dodecene used in Preparation of the Surface Active | Wetting times at 76° F.—Seconds | | | |
|---|---|---|---|---|
|  | .0 p. p. m. Hardness | | 300 p. p. m. Hardness | |
|  | Concentration of Surface Active | | Concentration of Surface Active | |
|  | 0.1% | 0.2% | 0.1% | 0.2% |
| Untreated | 26.1 | 6.3 | 30.2 | 17.0 |
| Treated | 21.3 | 5.3 | 25.2 | 15.1 |

The sulfonic acid produced by the process of Example 14 may be neutralized in a similar manner. Whichever process is used the resulting neutralized product is a white to a light colored slurry which may be used as such or drum or spray dried with or without the addition of builders such as sodium tripyrophosphate or the like to obtain a free flowing, non-hydroscopic powder of good odor and high detergency in both hard and soft water.

Obviously, many modifications and variations of the invention as hereinabove set forth may be made without departing from the spirit and scope thereof and only such limitations should be imposed as are indicated in the appended claims.

What is claimed is:

1. The process for the production of an alkaryl hydrocarbon substantially free of color and odor precursors which comprises polymerizing an olefin in the presence of a polymerization catalyst to polymers having the structure $RR'C=CH_2$ and $R''CH=CHR'''$ wherein the R's are alkyl radicals and may be the same or different, removing the catalyst sludge, fractionally distilling said polymers to obtain a fraction boiling within the range of 120–248° C., treating said fraction with a Friedel-Crafts catalyst at a temperature within the range of 25–150° C. for a period of time which may vary from 24 hours to ¼ hour whereby the polymers having the structure $RR'C=CH_2$ are condensed, allowing the resulting mixture to separate into two layers, a lower layer comprising the catalyst sludge and the condensed polymers and an upper layer comprising polymers having the structure $R''CH=CHR'''$, removing the lower layer, fractionally distilling the upper layer comprising said polymers to obtain a fraction boiling within the range of 120°–240° C., reacting said second mentioned fraction with an aromatic hydrocarbon in the presence of an alkylation catalyst to form an alkaryl hydrocarbon, allowing the resulting mixture to separate into two layers, removing the lower layer comprising the catalyst sludge, extracting the upper layer comprising the alkaryl hydrocarbon with 1 to 25 parts of sulfuric acid of an 80 to 100 percent concentration per 100 parts of the alkaryl hydrocarbon, allowing the resulting mixture to separate into two layers, removing the lower layer comprising sulfuric acid having dissolved therein the color and odor precursors, washing the upper layer comprising the alkaryl hydrocarbon with an aqueous alkali solution and then recovering the desired alkaryl hydrocarbon from said washed upper layer by fractional distillation.

2. The process for the production of an alkaryl hydrocarbon substantially free of color and odor precursors which comprises polymerizing an olefin having from 2 to 4 carbon atoms in the presence of a polymerization catalyst to polymers having from 6 to 18 carbon atoms, and the structure $RR'C=CH_2$ and $R''CH=CHR'''$ wherein the R's are alkyl radicals and may be the same or different, removing the catalyst sludge, fractionally distilling said polymers to obtain a fraction boiling within the range of 120–248° C., treating said fraction with a Friedel-Crafts catalyst at a temperature within the range of 25–150° C. for a period of time which may vary from 24 hours to ¼ hour whereby the polymers having the structure $RR'C=CH_2$ are condensed, allowing the resulting mixture to separate into two layers, a lower layer comprising the catalyst sludge and the condensed polymers and an upper layer comprising polymers having the structure $R''CH=CHR''$, removing the lower layer, fractionally distilling the upper layer comprising said polymers to obtain a fraction boiling within the range of 120–240° C., reacting said second mentioned fraction with an aromatic hydrocarbon in the presence of an alkylation catalyst to form an alkaryl hydrocarbon, allowing the resulting mixture to separate into two layers, removing the lower layer comprising the catalyst sludge, extracting the upper layer comprising the alkaryl hydrocarbon with 1 to 25 parts of sulfuric acid of an 80 to 100 percent concentration per 100 parts of the alkaryl hydrocarbon, allowing the resulting mixture to separate into two layers, removing the lower layer comprising sulfuric acid having dissolved therein the color and odor precursors, washing the upper layer comprising the alkaryl hydrocarbon with an aqueous alkali solution and then recovering the desired alkaryl hydrocarbon from said washed upper layer by fractional distillation.

3. The process for the production of an alkaryl hydrocarbon substantially free of color and odor precursors which comprises polymerizing an olefin having from 2 to 4 carbon atoms in the presence of a polymerization catalyst to polymers having from 9 to 15 carbon atoms, and the structure $RR'C=CH_2$ and $R''CH=CHR'''$ wherein the Rs are alkyl radicals and may be the same or different, removing the catalyst sludge, fractionally distilling said polymers to obtain a fraction boiling within the range of 120–248° C., treating said fraction with a Friedel-Crafts catalyst at a temperature within the range of 25–150° C. for a period of time which may vary from 24 hours to ¼ hour whereby the polymers having the structure $RR'C=CH_2$ are condensed, allowing the resulting mixture to separate into two layers, a lower layer comprising the catalyst sludge and the condensed polymers and an upper layer comprising polymers having the structure $R''CH=CHR'''$, removing the lower layer, fractionally distilling the upper layer comprising said polymers to obtain a fraction boiling within the range of 120–240° C., reacting said second mentioned fraction with an aromatic hydrocarbon in the presence of an alkylation catalyst to form an alkaryl hydrocarbon, allowing the resulting mixture to separate into two layers, removing the lower layer comprising the catalyst sludge, extracting the upper layer comprising the alkaryl hoydrocarbon with 1 to 25 parts of sulfuric acid of an 80 to 100 percent concentration per 100 parts of the alkaryl hydrocarbon, allowing the resulting mixture to separate into two layers, removing the lower layer comprising sulfuric acid having dissolved therein the color and odor precursors, washing the upper layer comprising the alkaryl hydrocarbon with an aqueous alkali solution and then recovering the desired alkaryl hydrocarbon from said washed upper layer by fractional distillation.

4. The process in accordance with claim 1 characterized further in that said olefin is predominately propylene.

5. The process in accordance with claim 1 characterized further in that said aromatic hydrocarbon is benzene.

6. The process in accordance with claim 1 characterized further in that said Friedel-Crafts catalyst and said alkylation catalyst are different.

7. The process in accordance with claim 1 characterized further in that said Friedel-Crafts catalyst and said alkylation catalyst are the same.

8. The process in accordance with claim 1 characterized further in that said Friedel-Crafts catalyst and said alkylation catalyst are both aluminum chloride.

References Cited in the file of this patent

UNITED STATES PATENTS

| | | |
|---|---|---|
| 2,320,256 | Bailey et al. | May 25, 1943 |
| 2,479,120 | Johnstone | Aug. 16, 1949 |
| 2,517,720 | Schaad | Aug. 8, 1950 |
| 2,572,724 | Hinds et al. | Oct. 23, 1951 |
| 2,597,834 | Claussen | May 20, 1952 |
| 2,655,530 | Nevison | Oct. 13, 1953 |